Patented July 16, 1929.

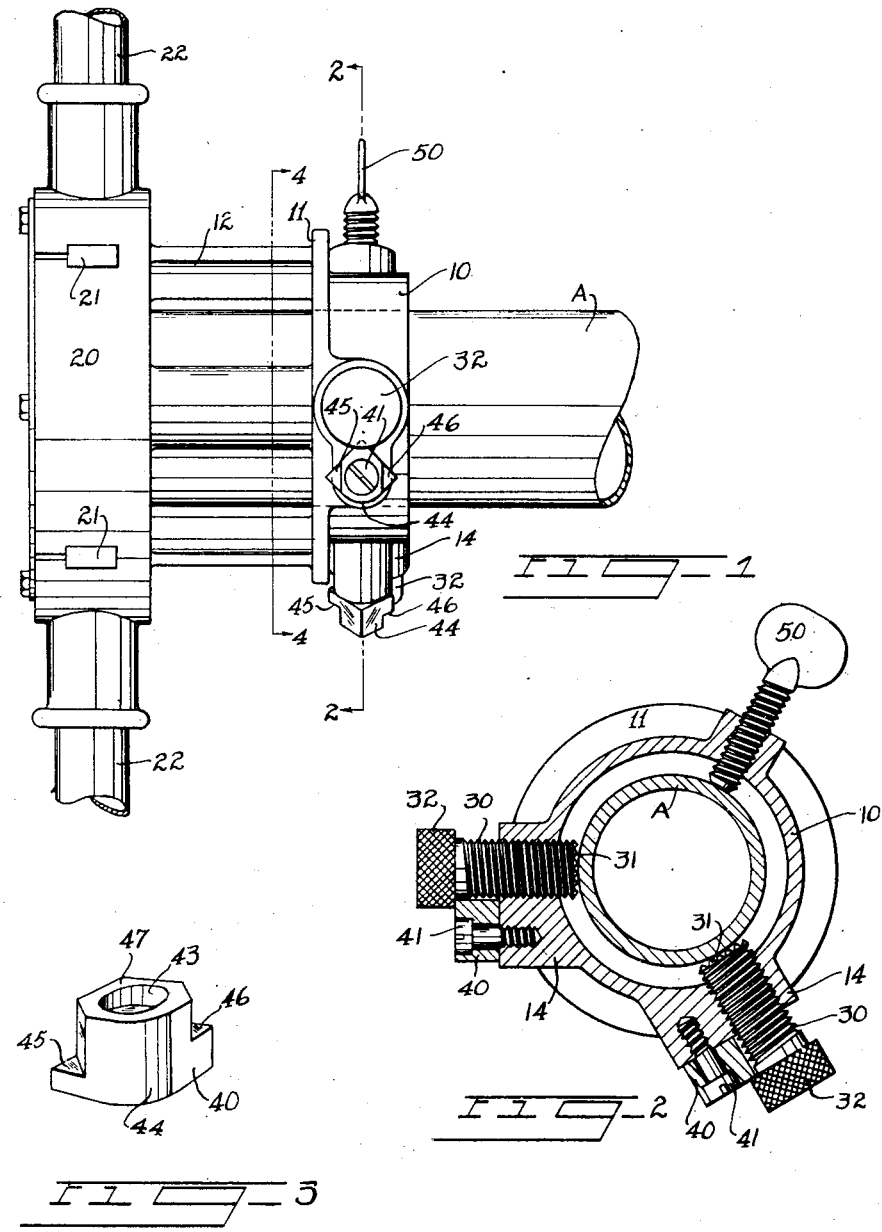

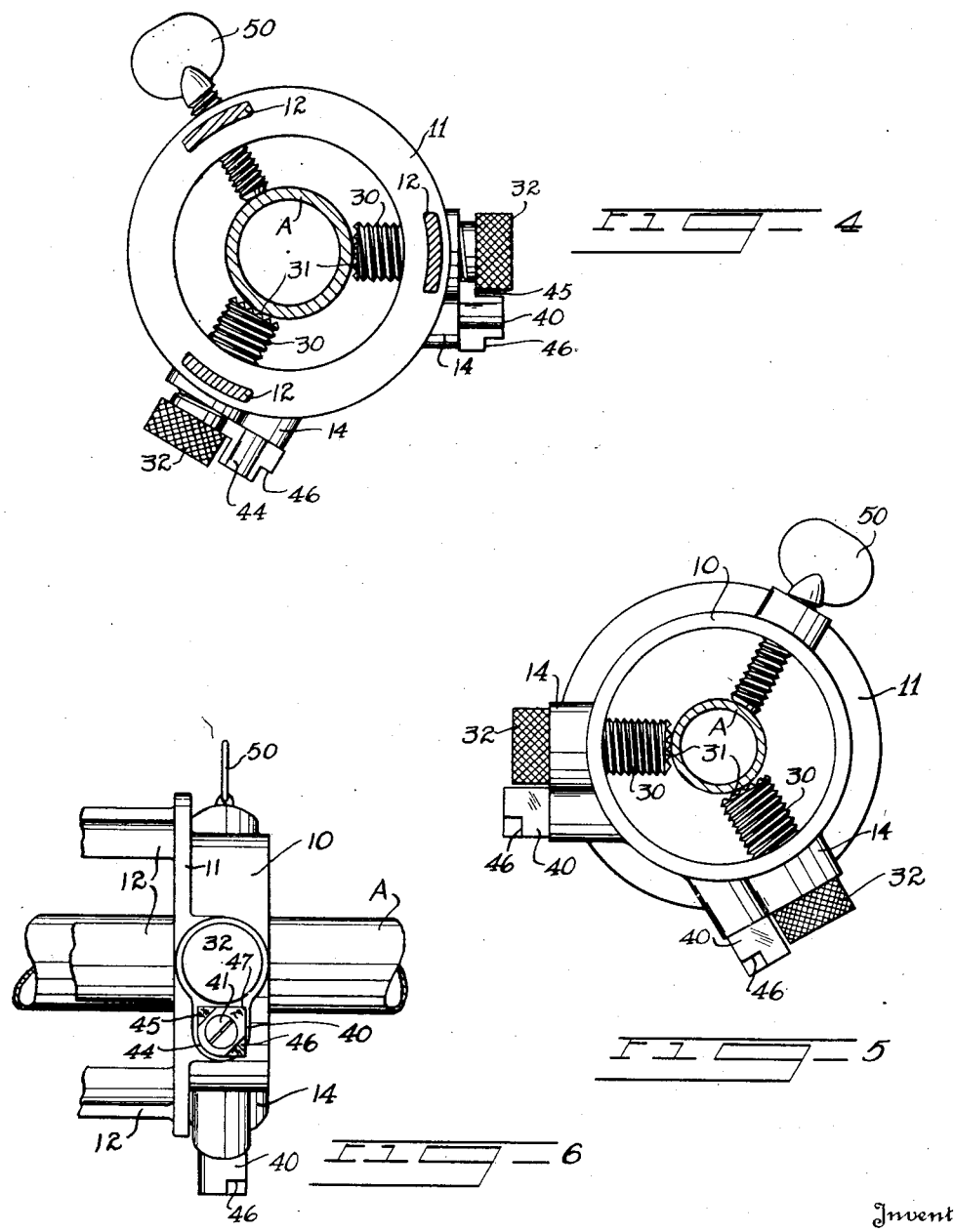

1,720,743

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

CENTERING DEVICE FOR PIPE-WORKING TOOLS.

Application filed February 29, 1928. Serial No. 257,937.

This invention relates to a centering clamp for such pipe working tools as die stocks, etc., which have a frame portion designed to be clamped to the pipe. The object is to provide a very simple and readily operable clamp which may be easily set for different sizes of pipe, after which the clamping with automatic centering is readily effected.

To the above end I provide two radial abutment screws 120° apart, and I associate with each a distance block having a plurality of shoulders of different height. This block may be turned so that the head of the screw will engage any desired shoulder and thus the screw may be turned to a definite position corresponding to the size of pipe. A third abutment screw, 120° from each of the screws thus set, is then turned in to clamp the pipe against the two positioned screws. In this manner the frame carrying the screws is centrally clamped on the pipe.

My invention is hereinafter more fully explained in connection with the drawings illustrating a preferred embodiment thereof, and the essential novel features are summarized in the claims.

In the drawings, Fig. 1 is a side elevation of an illustrative die stock equipped with my centering clamp; Fig. 2 is a cross-section through the clamp, in a plane indicated by the line 2—2 on Fig. 1, set for the largest size of pipe; Fig. 3 is a perspective of one of the movable distance blocks; Fig. 4 is a cross-section through the frame of the clamp in an intermediate plane as indicated by the line 4—4 on Fig. 1, looking in the opposite direction to Fig. 2; Fig. 5 is an end view, with the clamp adjusted for the smallest size of pipe; Fig. 6 is a fragmentary side elevation of the clamp set for the smallest size of pipe.

In Figs. 1 and 2, A indicates a pipe of the largest size with which the clamp is designed to coact. The clamp frame is an annular sleeve 10, shown as having a flange 11 from which extend suitable webs 12. These webs are joined at their distant end to some suitable member not shown, which carries a rotatable pipe working tool. This tool may, for instance, be a rotary head 20 having radial chasers 21, and operating handles 22, as indicated in Fig. 1. The head is designed to travel along the clamp frame as the head rotates and in such movement the chasers may recede, in any usual manner of receding die stocks, as will be well understood.

On the exterior of the sleeve portion 10 of the clamp, I form two bosses 14, through which extend two radial abutment screws 30, 30. These screws are placed 120° apart. Each is preferably of considerable diameter, as illustrated, and has a suitably roughened inner end 31 and a knurled head 32 presenting a flat shoulder on its inner face. Rotatively mounted on the face of each boss 14 is a block 40, shown as held in place by a screw 41 on which the block is journalled and which screws into the boss. This is preferably a filister headed screw sunk within an enlarged recess 43 in the block. The block is preferably square, except for one corner which is cut off concentrically, as shown at 44. This leaves the block with three projecting corners. These corners stand at different heights. Any of them may be brought into proximity to the head 32, and thus control the innermost position of the screw.

Assuming that the clamp is designed to clamp pipes of standard sizes varying from 1″ to 2″, that is, sizes 1″, 1¼″, 1½″, 2″, then the screw 30 is of such length that it will project inwardly the proper amount to engage the 1″ pipe when the head of the screw abuts the outer face of the boss 14. The lowest shoulder 45 of the block 40, if it is beneath the screw head and engaged by it, will position the screw so that its inner face is in its proper position for a 1¼″ pipe. When the opposite shoulder 46 of the block is engaged by the screw head, the screw will be positioned for a 1½″ pipe, and when a third shoulder 47 of the block, which may be the full height of the block, is engaged by the head of the screw, the screw will be positioned for a 2″ pipe.

Fig. 2 shows the two screws 30 positioned for a 2″ pipe A. In this case the heads of the two screws 30 engage the highest shoulder 47 on the block 40. Similarly, Fig. 4 illustrates the clamp set for a 1¼″ pipe, the blocks 40 having been turned so that the shoulders 45 are beneath the heads of the screws 30. With these screws 30 so positioned, the device is clamped on a pipe by turning in a third clamping screw 50 which is located 120° from each of the screws 30.

Fig. 5 illustrates the device set for the smallest size pipe, that is, a 1″ pipe. In that case, any side of the abutment block is positioned adjacent the screw head 32 (as illustrated in Fig. 6), and hence is out of the range of that head and the screw is turned in until the head abuts the outer face of the boss 14. In any case, after the two screws 30 are set for the size of pipe desired, it is only necessary to turn in the screws 50 to complete the clamping.

Thus, by positioning the blocks 40 and turning down the screws 30 as far as they will go, the device is set for that size of pipe. To change the size, it is only necessary to loosen the screws 30 by hand, turn the blocks 40 as desired, and reset the screws 30. If desired, the screws 41 which hold the blocks 40 may be left standing just tight enough so that the blocks may be turned, when relieved of the heads of the screws 30, but will not be accidentally displaced.

By rounding off one corner of the block 40, as indicated at 44, it is possible to swing the block from the 1¼″ size to the 1½″ size and vice versa without having to turn out the screw to the maximum height of the block. If the clamp has been set for the 1½″ size, it is necessary only to loosen the screw sufficiently to release the block and it may be swung to the 1¼″ size; if it has been set for the 1¼″ size, the screw need only be turned out far enough so that the 1½″ step 46 may swing beneath it.

It will be seen that the clamp is very simple and at the same time is effective in causing an accurate positioning of the abutment screws for the various sizes of pipe desired.

I claim:

1. A centering clamp for a pipe working tool comprising an annular frame, a pair of abutment members movably mounted therein, a pair of blocks respectively associated with the abutment members and each having a plurality of shoulders out of alignment and of different height and movable to present a selected shoulder to the exclusion of the others to the corresponding abutment member, and means for clamping the pipe against such abutment members.

2. In a centering clamp for pipe working tools, the combination of an annular frame, a pair of abutment screws threaded in the frame, and adapted to engage pipes of various sizes, a pair of blocks movably mounted on the frame and each having shoulders of different heights and in different lateral position adapted to be engaged by shoulders on the abutment screws.

3. In a centering clamp, the combination of an annular frame, a radial screw therein having an overhanging head, and a distance block movably mounted on the frame and having laterally spaced shoulders of different heights any one of which may be selectively positioned beneath such head to the exclusion of all of the others.

4. In a centering clamp for pipe working tools, the combination of an annular frame, a movable abutment member therein having an overhanging head, and a block rotatively mounted on the frame and having a plurality of shoulders of different heights adapted to be selectively brought into position between the head and frame.

5. In a centering clamp for pipe working tools, the combination of an annular frame, a radial screw threaded therein and having an overhanging head, a block rotatively secured on the frame adjacent the screw on an axis parallel therewith, said block having a pluarlity of shoulders of different heights, different ones of which may be brought beneath the head of the screw by rotating the block.

6. In a pipe centering clamp, the combination of an annular frame, a pair of screws radially mounted therein, substantially 120° apart, a block associated with each screw and movably mounted on the frame adjacent the screw and having a plurality of laterally spaced shoulders of different heights adapted to be engaged by the screw.

7. In a pipe centering clamp, the combination of an annular frame, a pair of screws threaded therein radially 120° apart, each screw having an overhanging head, a pair of blocks rotatively mounted on the frame adjacent the screws respectively, each block having a plurality of shoulders of a different height adapted to be selectively positioned beneath the head of the screw by turning the block on its axis, and a third screw 120° from those mentioned adapted to force the pipe against the two screws first mentioned.

8. In a pipe centering clamp, the combination of an annular frame, provided with a pair of bosses on its exterior, a pair of screws threaded through the respective bosses and located radially at substantially 120° apart, the outer face of each boss being at right angles to the axes of the screw and the screw being provided with an overhanging head, and a pair of blocks with laterally spaced steps, said blocks being held against the outer face of the bosses adjacent the screws and adapted to be moved to position a selected step between the head of the abutment screw and the face of the boss.

9. A centering clamp comprising an annular frame, an abutment screw threaded in the frame, a stopping block for the screw having shoulders of different heights in different lateral position, each adapted to be engaged to the exclusion of the others by a shoulder on the abutment screw, and means independent of the abutment screw for clamping the block in fixed position if desired.

10. In a centering clamp, the combination of an annular frame, a radial screw therein having an overhanging head, a distance block rotatably mounted on the frame on an axis parallel with, but out of coincidence with that of the screw, said distance block having laterally spaced shoulders of different heights, and means for clamping the distance block in fixed position.

11. In a centering clamp, the combination of an annular frame, a radial screw therein having an overhanging head, a distance block having laterally spaced shoulders of different heights, a clamping screw passing through the distance block and threaded into the frame and occupying a position parallel with and at the side of the said radial screw, said clamping screw being adapted to clamp the block in position with any one of its shoulders in position to be engaged by the head of the radial screw.

In testimony whereof, I hereunto affix my signature.

IRA W. NONNEMAN.